(12) United States Patent
Igarashi et al.

(10) Patent No.: US 7,977,999 B2
(45) Date of Patent: Jul. 12, 2011

(54) TEMPERATURE DETECTION CIRCUIT

(75) Inventors: Atsushi Igarashi, Chiba (JP);
Masakazu Sugiura, Chiba (JP)

(73) Assignee: Seiko Instruments Inc. (JP)

( * ) Notice: Subject to any disclaimer, the term of this patent is extended or adjusted under 35 U.S.C. 154(b) by 14 days.

(21) Appl. No.: 12/653,536

(22) Filed: Dec. 15, 2009

(65) Prior Publication Data

US 2010/0156507 A1    Jun. 24, 2010

(30) Foreign Application Priority Data

Dec. 24, 2008  (JP) ................................. 2008-327059

(51) Int. Cl.
*H01L 35/00*    (2006.01)
(52) U.S. Cl. ........................................ 327/512; 327/513
(58) Field of Classification Search .................. 327/512, 327/513
See application file for complete search history.

(56) References Cited

U.S. PATENT DOCUMENTS 7,579,899 B2 *  8/2009  Senriuchi et al. ............. 327/512
7,880,528 B2 *  2/2011  Igarashi ........................ 327/512

OTHER PUBLICATIONS

Patent Abstracts of Japan, publication No. 2001-165783, publication date Jun. 22, 2001.

* cited by examiner

*Primary Examiner* — Hai L Nguyen
(74) *Attorney, Agent, or Firm* — Adams & Wilks

(57) ABSTRACT

Provided is a temperature detection circuit capable of preventing malfunction, which may occur when power is turned on. A switch circuit for giving such a potential that a comparator detects a low temperature is provided at an output terminal of a temperature sensor circuit. A switch circuit for giving such a potential that the comparator detects a low temperature is provided at an output terminal of a reference voltage circuit. When the power is turned on, each of the switch circuits is set by a switch control circuit such that the comparator detects a low temperature.

4 Claims, 4 Drawing Sheets

TEMPERATURE DETECTION CIRCUIT

BACKGROUND OF THE INVENTION

1. Field of the Invention

The present invention relates to a temperature detection circuit for detecting a temperature.

2. Description of the Related Art

Description is made of a conventional temperature detection circuit. FIG. 7 illustrates the conventional temperature detection circuit.

In a temperature sensor circuit 51, when a temperature T rises, a temperature voltage Vtemp falls, while, when the temperature T falls, the temperature voltage Vtemp rises.

When the temperature T rises and the temperature voltage Vtemp falls below a reference voltage Vref of a reference voltage circuit 52, that is, when the temperature T reaches a set temperature which is set by the reference voltage Vref, an output voltage Vout of a comparator 53 becomes HIGH and the temperature detection circuit enters a detection state (see, for example, Japanese Patent Application Laid-open No. 2001-165783 (FIG. 3)).

However, according to the conventional technology, during a time period, in which the power is turned on, and output of the temperature voltage Vtemp and output of the reference voltage Vref are insufficient, there is a risk that the output voltage Vout of the comparator 53 erroneously becomes HIGH and the temperature detection circuit erroneously enters the detection state.

SUMMARY OF THE INVENTION

The present invention has been made in view of the above-mentioned problem, and an object of the present invention is to provide a temperature detection circuit which may prevent malfunction when the power is turned on.

In order to solve the above-mentioned problem, the present invention provides a temperature detection circuit for detecting a temperature, including: a temperature sensor circuit for producing a temperature voltage based on the temperature; a reference voltage circuit for producing a reference voltage for setting a set temperature; a comparator for comparing the temperature voltage with the reference voltage, thereby detecting that the temperature reaches the set temperature to enter a detection state; and at least one of: a first switch circuit which operates so that, when power is turned on, the temperature voltage is not applied to the comparator but a first power supply voltage is applied to the comparator, thereby compulsorily fixing the comparator in a non-detection state; and a second switch circuit which operates so that, when the power is turned on, the reference voltage is not applied to the comparator but a second power supply voltage is applied to the comparator, thereby compulsorily fixing the comparator in the non-detection state.

According to the present invention, by turning on at least one of the first switch circuit and the second switch circuit when the power is turned on, the comparator is compulsorily fixed in the non-detection state, and thus, the comparator and the temperature detection circuit do not erroneously enter the detection state. Therefore, the comparator and the temperature detection circuit do not malfunction when the power is turned on.

DETAILED DESCRIPTION OF THE INVENTION

Embodiments of the present invention are described in the following with reference to the attached drawings.

Figure 1:
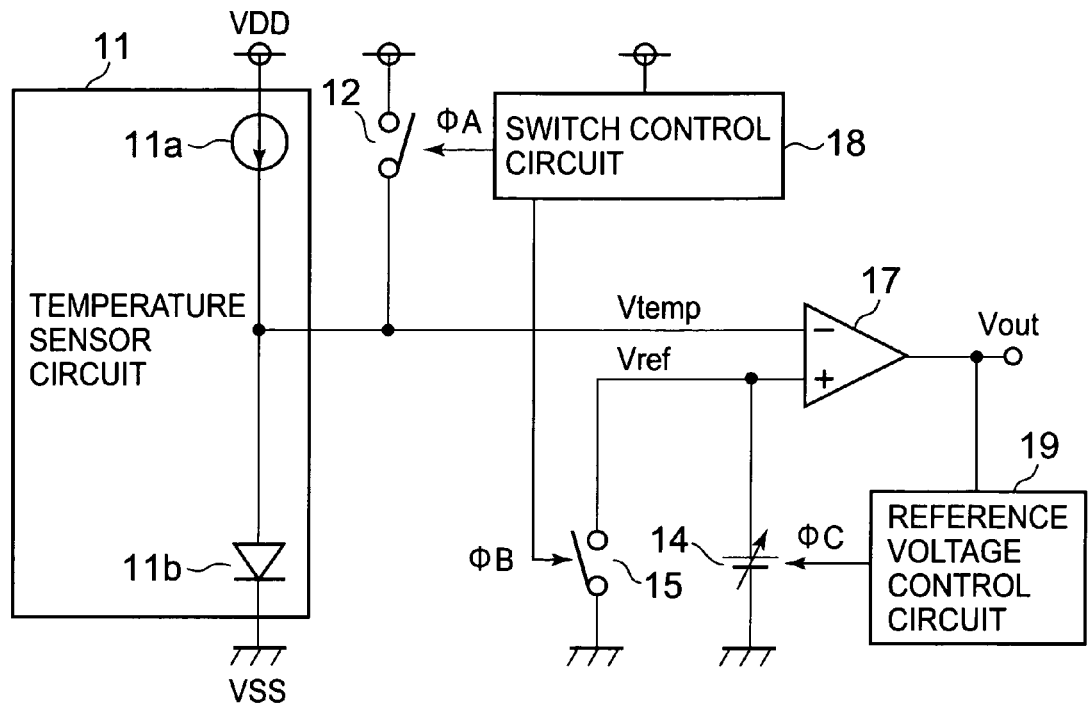
FIG. 1 illustrates a temperature detection circuit according to the present invention.
Figure 2:
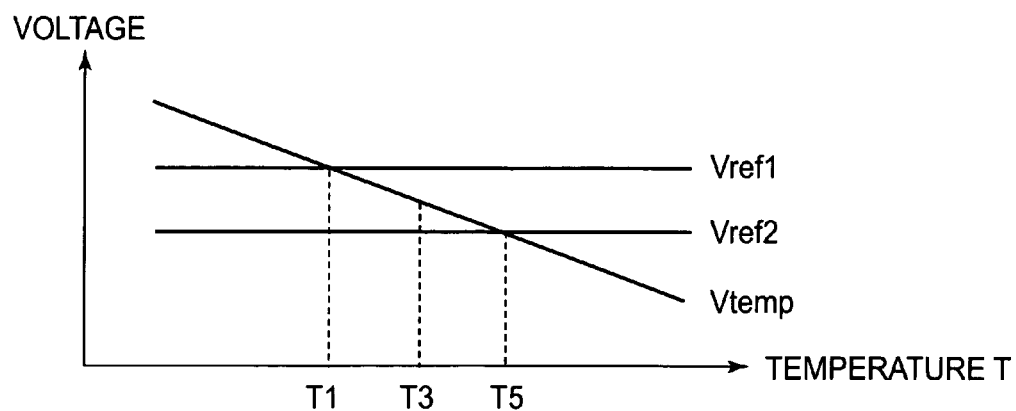
FIG. 2 is a graph of temperature versus temperature voltage and reference voltage.

First, a structure of a temperature detection circuit is described. FIG. 1 illustrates the temperature detection circuit. FIG. 2 is a graph of temperature versus temperature voltage and reference voltage.

The temperature detection circuit includes a temperature sensor circuit 11, a switch circuit 12, a reference voltage circuit 14, a switch circuit 15, a comparator 17, a switch control circuit 18, and a reference voltage control circuit 19. The temperature sensor circuit 11 includes a current source 11a and a diode 11b.

The current source 11a is provided between a power supply terminal and an inverting input terminal of the comparator 17. The diode 11b is provided between the inverting input terminal of the comparator 17 and a ground terminal. The switch circuit 12 is provided between the power supply terminal and the inverting input terminal of the comparator 17. The reference voltage circuit 14 is provided between a non-inverting input terminal of the comparator 17 and the ground terminal. The switch circuit 15 is provided between the non-inverting input terminal of the comparator 17 and the ground terminal. The switch control circuit 18 provides on/off control of the switch circuit 12 and the switch circuit 15 based on a power supply voltage VDD. The reference voltage control circuit 19 controls a reference voltage Vref based on an output voltage of the comparator 17 (output voltage Vout).

The temperature sensor circuit 11 produces a temperature voltage Vtemp based on a temperature T. The reference voltage circuit 14 produces the reference voltage Vref for setting a set temperature. By comparing the temperature voltage Vtemp with the reference voltage Vref, the comparator 17 detects that the temperature T reaches the set temperature and enters a detection state.

The switch circuit 12 is turned on when the power is turned on, and operates such that the temperature voltage Vtemp is not applied to the inverting input terminal of the comparator 17 but the power supply voltage VDD is applied to the inverting input terminal of the comparator 17, thereby compulsorily fixing the comparator 17 in a non-detection state. The switch circuit 15 is turned on when the power is turned on, and operates such that the reference voltage Vref is not applied to the non-inverting input terminal of the comparator 17 but a ground voltage VSS is applied to the non-inverting input terminal of the comparator 17, thereby compulsorily fixing the comparator 17 in the non-detection state.

The switch control circuit 18 monitors the power supply voltage VDD. The switch control circuit 18 turns on the switch circuit 12 and the switch circuit 15 when the power is turned on, and operates such that the power supply voltage VDD and the ground voltage VSS are applied to the inverting input terminal and the non-inverting input terminal of the comparator 17, respectively. The switch control circuit 18 is, for example, a power-on reset circuit. The reference voltage control circuit 19 monitors the output voltage of the comparator 17 (output voltage Vout). When the comparator 17 changes from the non-detection state to the detection state, the reference voltage control circuit 19 operates such that the reference voltage Vref changes from a reference voltage Vref2 to a reference voltage Vref1. When the comparator 17 changes from the detection state to the non-detection state, the reference voltage control circuit 19 operates such that the reference voltage Vref changes from the reference voltage Vref1 to the reference voltage Vref2.

As illustrated in FIG. 2, the reference voltage Vref1 is higher than the reference voltage Vref2. The reference voltage Vref1 and the reference voltage Vref2 have almost no temperature coefficient, while the temperature voltage Vtemp has a negative temperature coefficient.

Figure 3:
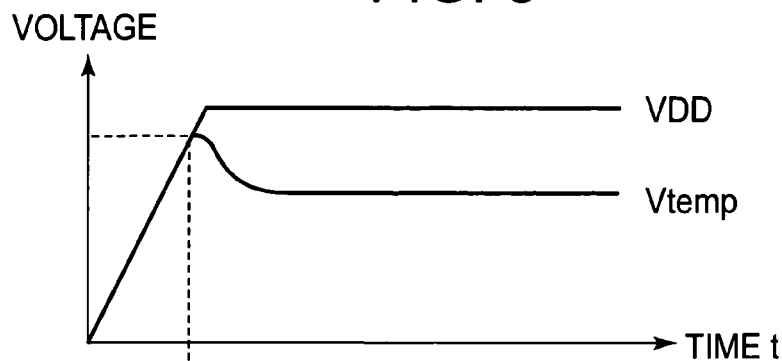
FIG. 3 is a time chart of the temperature voltage and the reference voltage of the temperature detection circuit according to the present invention.
Figure 3:
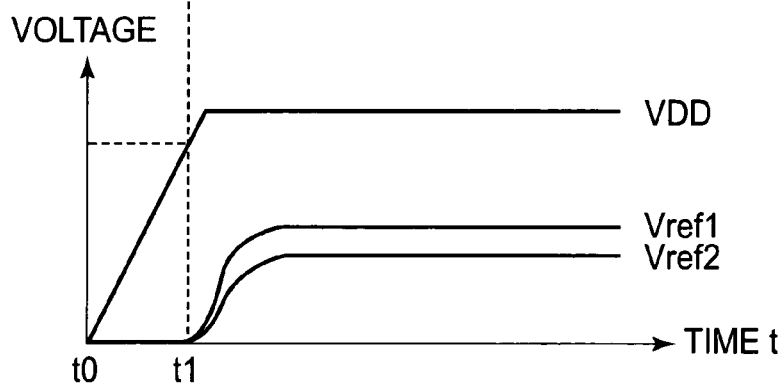

Next, operation of the temperature detection circuit when the power supply voltage VDD slowly rises is described. FIG. 3 is a time chart of the temperature voltage and the reference voltage.

When $t0 \leq t < t1$ (when the power is turned on), the power supply voltage VDD slowly rises, and the power supply voltage VDD is lower than a predetermined voltage. In this state, the switch control circuit 18 outputs a signal $\Phi A$ and a signal $\Phi B$ to the switch circuit 12 and the switch circuit 15 such that the switch circuit 12 and the switch circuit 15 are turned on, respectively. Then, the switch circuit 12 is turned on, the inverting input terminal of the comparator 17 is connected to the power supply terminal, and the temperature voltage Vtemp becomes the power supply voltage VDD. The switch circuit 15 is turned on, the non-inverting input terminal of the comparator 17 is connected to the ground terminal, and the reference voltage Vref1 or the reference voltage Vref2 becomes the ground voltage VSS. Therefore, when the power is turned on, the output voltage Vout is fixed to LOW and the comparator 17 and the temperature detection circuit are fixed in the non-detection state.

When $t=t1$, the power supply voltage VDD becomes the predetermined voltage. In this state, the switch control circuit 18 outputs the signal $\Phi A$ and the signal $\Phi B$ to the switch circuit 12 and the switch circuit 15 such that the switch circuit 12 and the switch circuit 15 are turned off, respectively. Then, the switch circuit 12 is turned off, the inverting input terminal of the comparator 17 is disconnected from the power supply terminal, and the temperature voltage Vtemp becomes the output voltage of the temperature sensor circuit 11. The switch circuit 15 is turned off, the non-inverting input terminal of the comparator 17 is disconnected from the ground terminal, and the reference voltage Vref1 or the reference voltage Vref2 becomes the output voltage of the reference voltage circuit 14. However, because, at this time, the temperature voltage Vtemp is almost equal to the power supply voltage VDD and the reference voltage Vref1 or the reference voltage Vref2 is almost equal to the ground voltage VSS, the output voltage Vout stays LOW and the comparator 17 and the temperature detection circuit stay fixed in the non-detection state.

When $t>t1$, in the temperature sensor circuit 11, the current source 11a causes a constant current to flow and, based on the constant current, the diode 11b outputs the temperature voltage Vtemp which depends on the temperature. The reference voltage circuit 14 outputs the reference voltage Vref1 or the reference voltage Vref2.

Therefore, the temperature voltage Vtemp slowly reaches voltage based on the temperature T at a time t, while the reference voltage Vref1 or the reference voltage Vref2 slowly reaches the voltage set in advance.

Here, when, for example, as illustrated in FIG. 2, the reference voltage Vref is the reference voltage Vref2 and the temperature voltage Vtemp reaches the reference voltage Vref2, that is, the temperature T reaches a set temperature T5, the output voltage Vout becomes HIGH and the comparator 17 and the temperature detection circuit enters the detection state. Then, the reference voltage control circuit 19 outputs a signal $\Phi C$ to the reference voltage circuit 14 such that the reference voltage Vref changes from the reference voltage Vref2 to the reference voltage Vref1. Therefore, even when the temperature T falls from the set temperature T5 to reach a set temperature T3, the temperature voltage Vtemp does not reach the reference voltage Vref1, and thus, the output voltage Vout stays HIGH and the comparator 17 and the temperature detection circuit stay fixed in the detection state. After that, when the temperature T further falls to reach a set temperature T1, that is, the temperature voltage Vtemp reaches the reference voltage Vref1, the output voltage Vout becomes LOW and the comparator 17 and the temperature detection circuit are fixed in the non-detection state.

Figure 4:
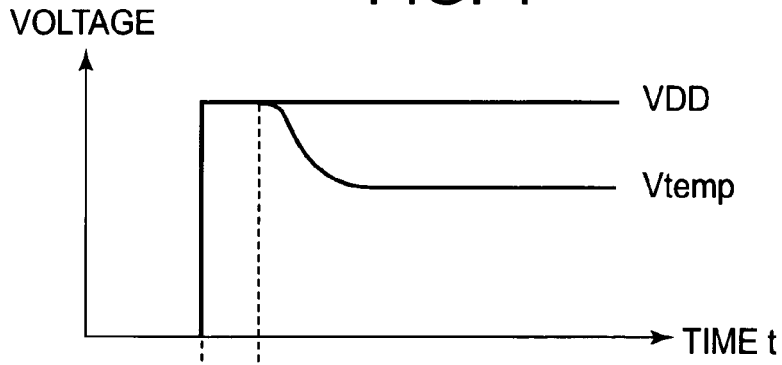
FIG. 4 is another time chart of the temperature voltage and the reference voltage of the temperature detection circuit according to the present invention.
Figure 4:
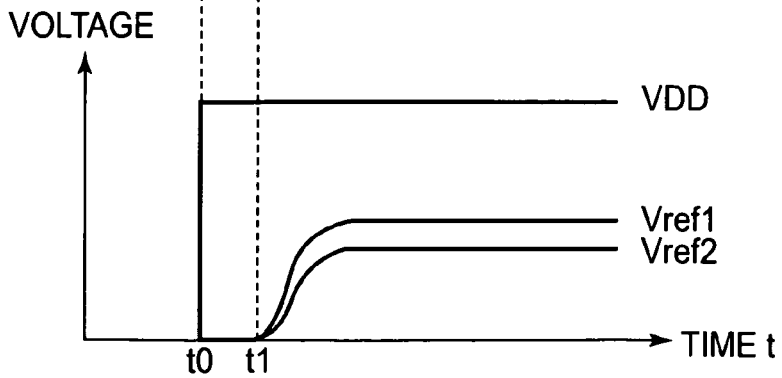

Next, operation of the temperature detection circuit when the power supply voltage VDD quickly rises is described. FIG. 4 is a time chart of the temperature voltage and the reference voltage.

When $t=t0$ (when the power is turned on), the power supply voltage VDD quickly rises. In this state, the switch control circuit 18 outputs a signal $\Phi A$ and a signal $\Phi B$ to the switch circuit 12 and the switch circuit 15 such that the switch circuit 12 and the switch circuit 15 are turned on, respectively. Then, the switch circuit 12 is turned on, the inverting input terminal of the comparator 17 is connected to the power supply terminal, and the temperature voltage Vtemp becomes the power supply voltage VDD. The switch circuit 15 is turned on, the non-inverting input terminal of the comparator 17 is connected to the ground terminal, and the reference voltage Vref1 or the reference voltage Vref2 becomes the ground voltage VSS. Therefore, when the power is turned on, the output voltage Vout is fixed to LOW and the comparator 17 and the temperature detection circuit are fixed in the non-detection state.

When $t0<t<t1$ (when the power is turned on), a predetermined time period has not passed after the power supply voltage VDD quickly rises. In this state, the switch control circuit 18 stays outputting the signal $\Phi A$ and the signal $\Phi B$ to the switch circuit 12 and the switch circuit 15 such that the switch circuit 12 and the switch circuit 15 are turned on, respectively. Therefore, the output voltage Vout stays fixed to LOW and the comparator 17 and the temperature detection circuit stay fixed in the non-detection state.

When $t=t1$, the predetermined time period has passed after the power supply voltage VDD quickly rises. In this state, the switch control circuit 18 outputs the signal $\Phi A$ and the signal $\Phi B$ to the switch circuit 12 and the switch circuit 15 such that the switch circuit 12 and the switch circuit 15 are turned off, respectively. Then, the switch circuit 12 is turned off, the inverting input terminal of the comparator 17 is disconnected from the power supply terminal, and the temperature voltage Vtemp becomes the output voltage of the temperature sensor circuit 11. The switch circuit 15 is turned off, the non-inverting input terminal of the comparator 17 is disconnected from the ground terminal, and the reference voltage Vref1 or the reference voltage Vref2 becomes the output voltage of the reference voltage circuit 14. However, because, in this state, the temperature voltage Vtemp is almost equal to the power supply voltage VDD and the reference voltage Vref1 or the reference voltage Vref2 is almost equal to the ground voltage VSS, the output voltage Vout stays LOW and the comparator 17 and the temperature detection circuit stay fixed in the non-detection state.

When t>t1, the temperature voltage Vtemp slowly reaches the voltage based on the temperature T at the time t, while the reference voltage Vref1 or the reference voltage Vref2 slowly reaches the voltage set in advance.

In this way, by turning on the switch circuit 12 and the switch circuit 15 when the power is turned on, the comparator 17 is compulsorily fixed in the non-detection state, and thus, the comparator 17 and the temperature detection circuit do not erroneously enter the detection state. Therefore, the comparator 17 and the temperature detection circuit do not malfunction when the power is turned on.

Further, the switch control circuit 18 is a power-on reset circuit or the like and is originally provided in the semiconductor device. Therefore, the size of the temperature detection circuit becomes larger just by the size of the additional two switch circuits, and thus, the size of the temperature detection circuit almost does not become larger.

It is to be noted that the temperature sensor circuit 11 is a circuit for producing a voltage based on the temperature using a diode, a bipolar transistor, and the like, and is not limited to the circuit structure illustrated in FIG. 1.

Further, the switch circuit 12 is a circuit for applying, when the power is turned on, the power supply voltage VDD to the inverting input terminal of the comparator 17, and is not limited to the circuit structure illustrated in FIG. 1. The same may be said with regard to the switch circuit 15. For example, the switch circuit 15 may include a pull-down resistor provided between the non-inverting input terminal of the comparator 17 and the ground terminal and a switch provided between the non-inverting input terminal of the comparator 17 and an output terminal of the reference voltage circuit 14. With this structure, when the power is turned on, the switch is turned off and the non-inverting input terminal of the comparator 17 is pulled down.

Further, the temperature coefficient of the temperature voltage Vtemp is negative. Alternatively, though not illustrated, the temperature coefficient thereof may be positive.

Further, when the output voltage Vout becomes HIGH, the comparator 17 and the temperature detection circuit enter the detection state. Alternatively, though not illustrated, when the output voltage Vout becomes LOW, the comparator 17 and the temperature detection circuit may enter the detection state.

Figure 5:
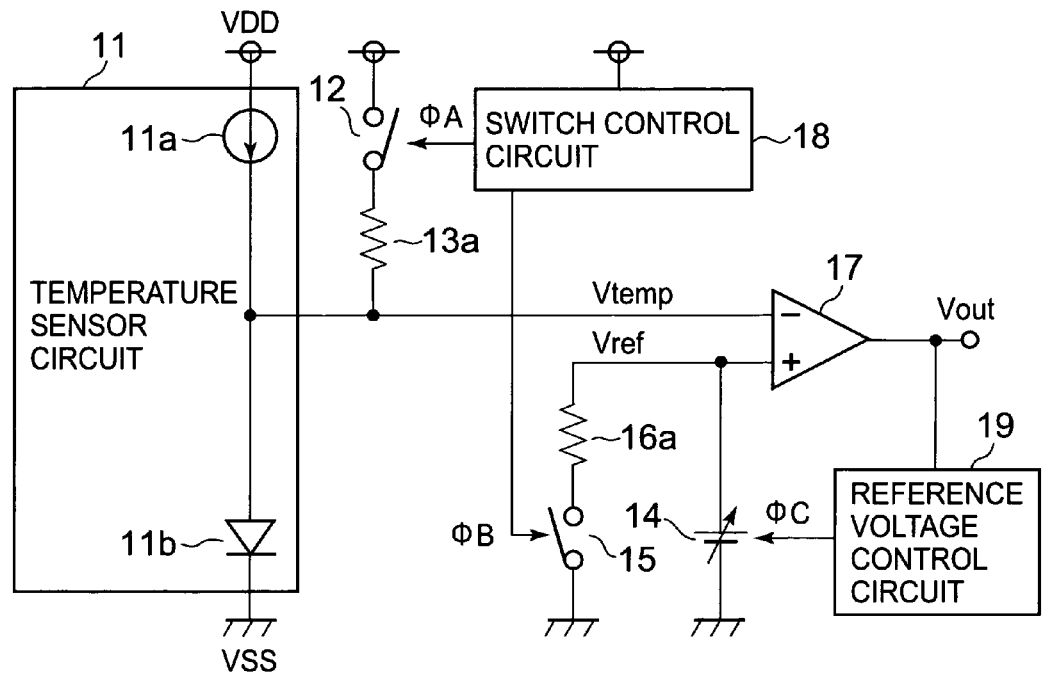
FIG. 5 illustrates another temperature detection circuit according to the present invention.

Still further, as illustrated in FIG. 5, a resistor 13a located in the current path through which the current passes when the switch circuit 12 is turned on and a resistor 16a located in the current path through which the current passes when the switch circuit 15 is turned on may be additionally provided. Then, an overcurrent does not pass through the current paths to protect devices in the current paths.

Figure 6:
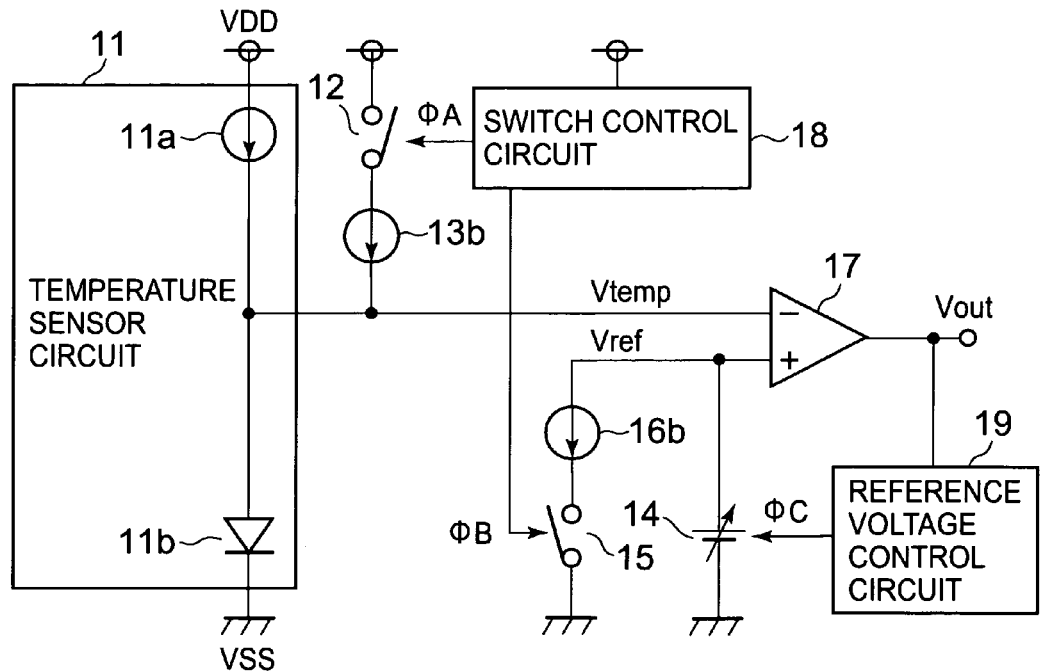
FIG. 6 illustrates still another temperature detection circuit according to the present invention.
Figure 7:
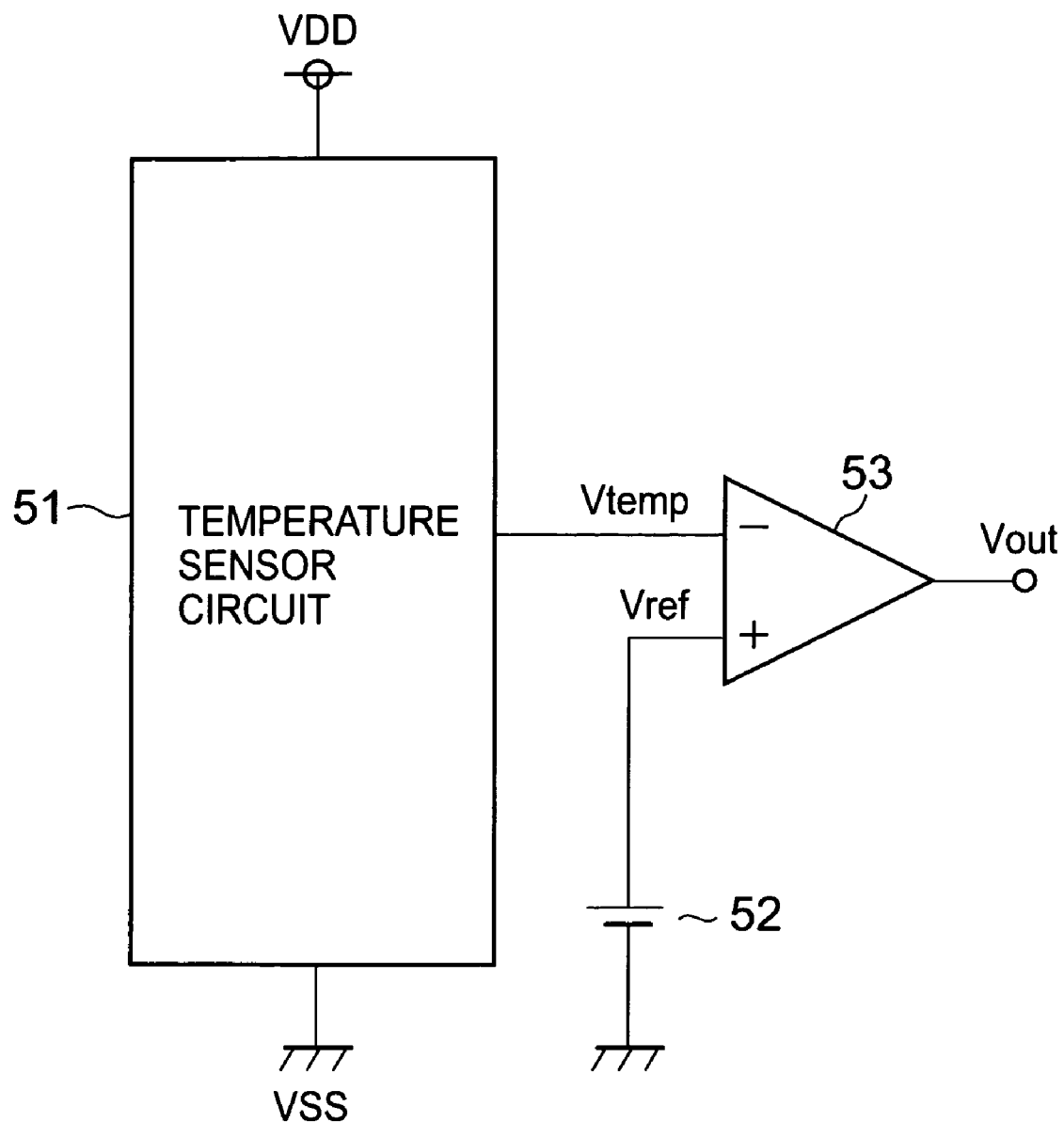
FIG. 7 illustrates a conventional temperature detection circuit.

Still further, as illustrated in FIG. 6, a current source 13b located in the current path through which the current passes when the switch circuit 12 is turned on and a current source 16b located in the current path through which the current passes when the switch circuit 15 is turned on may be additionally provided. Then, an overcurrent does not pass through the current paths to protect devices in the current paths.

Further, in order to compulsorily fix the comparator 17 in the non-detection state when the power is turned on, the switch circuit 12 and the switch circuit 15 are used. However, though not illustrated, only one of the switch circuit 12 and the switch circuit 15 may be used.

What is claimed is:

1. A temperature detection circuit comprising:
   a temperature sensor circuit for producing a temperature voltage based on a temperature;
   a reference voltage circuit for producing a reference voltage for setting a set temperature;
   a comparator for comparing the temperature voltage with the reference voltage, thereby detecting that the temperature reaches the set temperature to enter a detection state; and
   at least one of: a first switch circuit which operates so that, when power is turned on, the temperature voltage is not applied to the comparator but a first power supply voltage is applied to the comparator, thereby compulsorily fixing the comparator in a non-detection state; and a second switch circuit which operates so that, when the power is turned on, the reference voltage is not applied to the comparator but a second power supply voltage is applied to the comparator, thereby compulsorily fixing the comparator in the non-detection state.

2. A temperature detection circuit according to claim 1, further comprising at least one of:
   one of a resistor and a current source provided in a current path through which a current passes when the first switch circuit is turned on; and
   one of a resistor and a current source provided in a current path through which a current passes when the second switch circuit is turned on.

3. A temperature detection circuit according to claim 1, further comprising a switch control circuit for controlling, when the power is turned on, at least one of the first switch circuit and the second switch circuit and operating so that at least one of the first power supply voltage and the second power supply voltage is applied to the comparator.

4. A temperature detection circuit according to claim 1, further comprising a reference voltage control circuit for monitoring an output voltage of the comparator and operating so that, when the comparator changes one of from the non-detection state to the detection state and from the detection state to the non-detection state, the reference voltage changes one of from a second reference voltage to a first reference voltage and from the first reference voltage to the second reference voltage.

* * * * *